US012739729B2

(12) United States Patent
Chen et al.

(10) Patent No.: US 12,739,729 B2
(45) Date of Patent: Sep. 15, 2026

(54) MACHINE-LEARNING ASSISTED ENVIRONMENT DETECTION FRAMEWORK FOR SELF-ADAPTING INTER-RAT STEERING STRATEGY

(71) Applicant: MediaTek Inc., Hsinchu City (TW)

(72) Inventors: Yan-Ting Chen, Hsinchu City (TW); Pei-Tsung Wu, Hsinchu City (TW); Wei-Hao Pan, Hsinchu City (TW); I-Ching Niu, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 424 days.

(21) Appl. No.: 17/985,846

(22) Filed: Nov. 12, 2022

(65) Prior Publication Data

US 2023/0164660 A1 May 25, 2023

Related U.S. Application Data

(60) Provisional application No. 63/282,741, filed on Nov. 24, 2021.

(51) Int. Cl.

| | |
|---|---|
| ***H04W 36/38*** | (2009.01) |
| ***G06F 18/24*** | (2023.01) |
| ***G06N 20/00*** | (2019.01) |
| ***H04L 41/16*** | (2022.01) |
| ***H04W 36/00*** | (2009.01) |
| ***H04W 36/06*** | (2009.01) |
| ***H04W 36/14*** | (2009.01) |
| ***H04W 36/30*** | (2009.01) |

(52) U.S. Cl.

CPC ............ *H04W 36/38* (2013.01); *G06F 18/24* (2023.01); *G06N 20/00* (2019.01); *H04L 41/16* (2013.01);

(Continued)

(58) Field of Classification Search

CPC .......... H04W 36/38; H04W 36/00837; H04W 36/06; H04W 36/0083; H04W 36/14;

(Continued)

(56) References Cited

U.S. PATENT DOCUMENTS

2012/0322447 A1 12/2012 Ramachandran et al.
2013/0034080 A1 2/2013 Yang et al.

(Continued)

FOREIGN PATENT DOCUMENTS

| | | | |
|---|---|---|---|
| JP | 2018170551 A * | 11/2018 | |
| WO | WO-2013019288 A1 * | 2/2013 | ............ H04W 48/18 |
| WO | WO 2021061302 A1 | 4/2021 | |

OTHER PUBLICATIONS

U.S. Appl. No. 63/156,765, filed Mar. 4, 2021 (Year: 2021).*
Taiwan Intellectual Property Office, Office Action in Taiwan Patent Application No. 111144957, Mar. 30, 2023.

*Primary Examiner* — Jay L Vogel

(74) *Attorney, Agent, or Firm* — Andy M. Han; Han IP PLLC

(57) ABSTRACT

Techniques pertaining to a machine-learning assisted environment detection framework for self-adapting inter-radio access technology (inter-RAT) steering strategy in wireless communications are described. A user equipment (UE) extracts one or more feature metrics regarding a wireless network environment based at least partially on sensor information received from one or more sensors of the UE and radio frequency (RF) signal information from a RF circuit of the UE. The UE identifies a scenario with respect to a current status of the wireless network environment according to the one or more feature metrics. In response to identifying the scenario, the UE performs a RAT-related operation.

5 Claims, 11 Drawing Sheets

(52) U.S. Cl.
CPC . *H04W 36/0083* (2013.01); *H04W 36/00837* (2018.08); *H04W 36/06* (2013.01); *H04W 36/14* (2013.01); *H04W 36/30* (2013.01)

(58) Field of Classification Search
CPC ........ H04W 36/30; H04L 41/16; G06F 18/24; G06N 20/00
See application file for complete search history.

(56) References Cited

U.S. PATENT DOCUMENTS

2014/0051449 A1* 2/2014 Yerrabommanahalli .................... H04W 36/305 455/437
2015/0208311 A1 7/2015 Lee et al.
2015/0271627 A1* 9/2015 Nakano ................... H04W 4/80 455/445
2016/0021494 A1 1/2016 Yang et al.
2016/0302128 A1* 10/2016 Anchan ................. H04W 72/20
2019/0149274 A1* 5/2019 Freda .................... H04L 1/1819 370/329
2020/0267717 A1 8/2020 Ramanath
2021/0007023 A1 1/2021 Umapathy et al.
2021/0329514 A1* 10/2021 Chin ................. H04W 36/0094
2022/0038861 A1* 2/2022 Pezeshki ............... H04W 4/027
2022/0060917 A1* 2/2022 Vitthaladevuni ........ G06N 3/08
2022/0286994 A1* 9/2022 Singh .................... H04W 24/04
2023/0025432 A1* 1/2023 Da Silva ............. H04W 64/006
2023/0047063 A1* 2/2023 Kuppelur ........ H04W 36/00226

* cited by examiner

600

Stage 1
- UE enters a tunnel while a VoNR call is ongoing via a connection with a 5G network

Stage 2
- OOS happens due to 5G cell signal degradation
- UE detects a change in signal pattern(s) and determines whether it is a short-period OOS or a long-period OOS

Stage 3-1 (Short-Period OOS)
- UE holds on VoNR session and reconnects to the 5G network after 5G cell signal resumes

Stage 3-2 (Long-Period OOS)
- UE triggers EPS fallback (if a 4G network is available) and reestablishes cell session on LTE

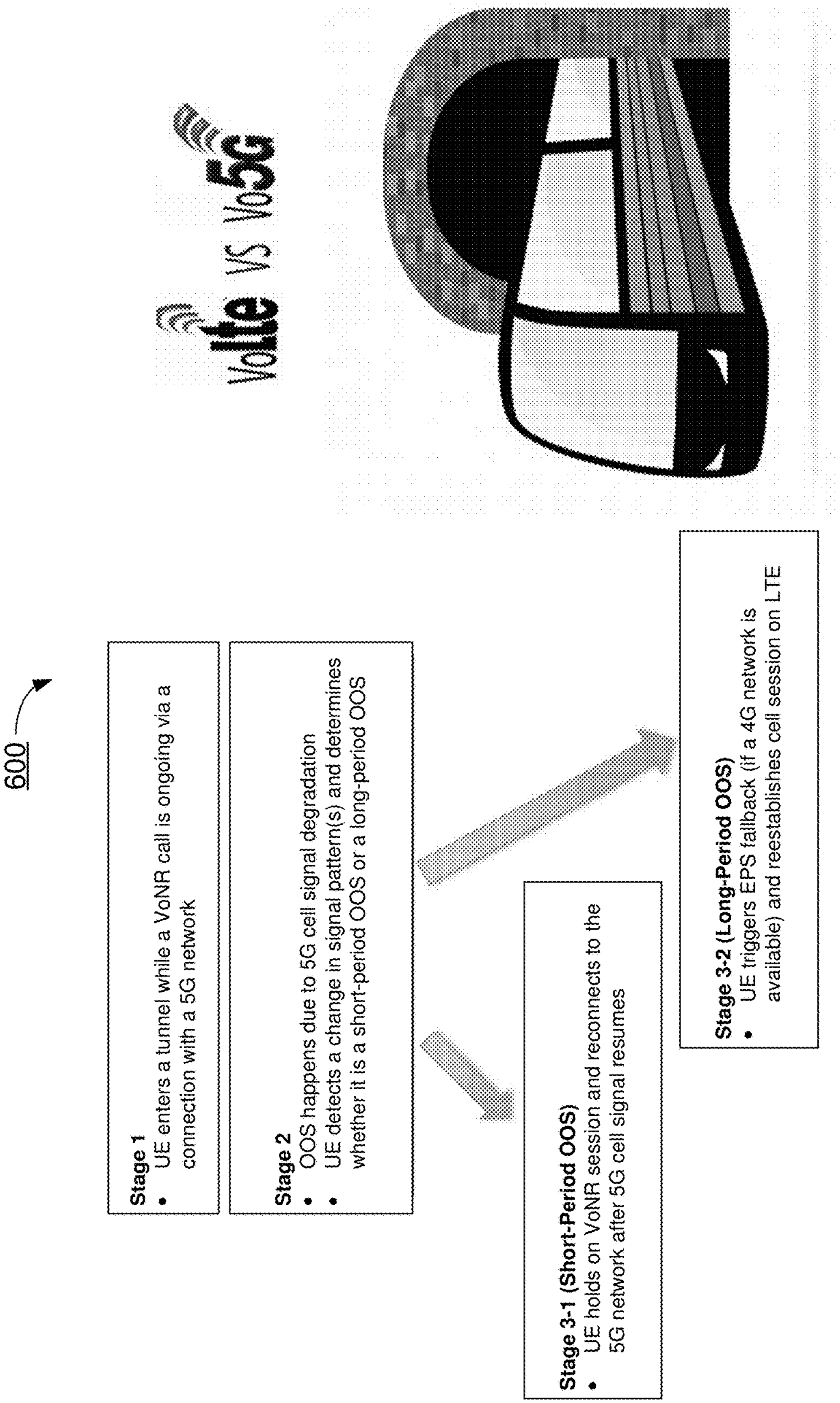

EXTRACT, BY A PROCESSOR OF A USER EQUIPMENT (UE), ONE OR MORE FEATURE METRICS REGARDING A WIRELESS NETWORK ENVIRONMENT BASED AT LEAST PARTIALLY ON SENSOR INFORMATION RECEIVED FROM ONE OR MORE SENSORS OF THE UE AND RADIO FREQUENCY (RF) SIGNAL INFORMATION FROM A RF CIRCUIT OF THE UE

1010

IDENTIFY, BY THE PROCESSOR, A SCENARIO WITH RESPECT TO A CURRENT STATUS OF THE WIRELESS NETWORK ENVIRONMENT ACCORDING TO THE ONE OR MORE FEATURE METRICS

1020

PERFORM, BY THE PROCESSOR, A RADIO ACCESS TECHNOLOGY (RAT)-RELATED OPERATION RESPONSIVE TO THE IDENTIFYING OF THE SCENARIO

1030

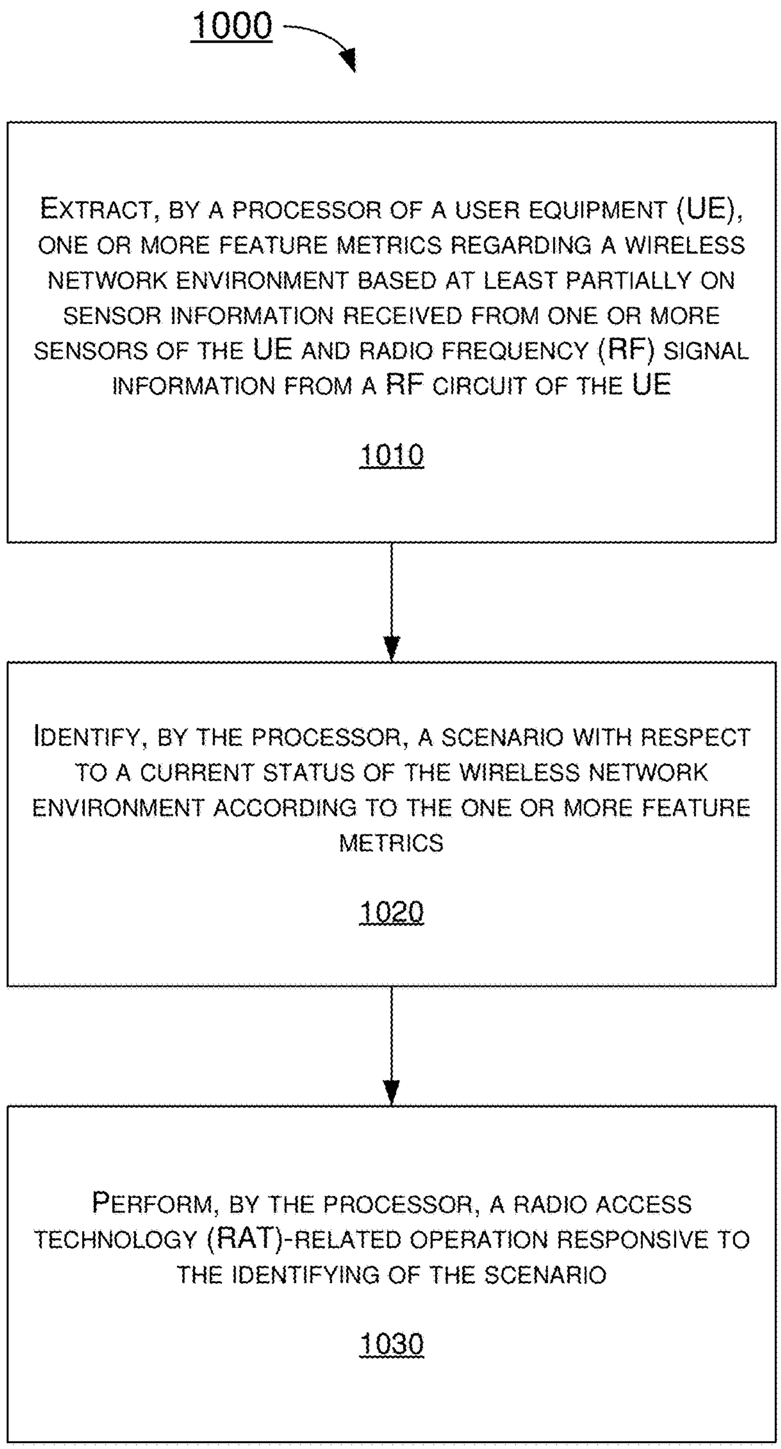

TRAIN, BY A PROCESSOR OF A USER EQUIPMENT (UE), A MACHINE-LEARNING MODEL FOR RADIO FREQUENCY (RF) FEATURE EXTRACTION
1110

UTILIZE, BY THE PROCESSOR, THE MACHINE-LEARNING MODEL TO EXTRACT ONE OR MORE FEATURE METRICS REGARDING A WIRELESS NETWORK ENVIRONMENT BASED AT LEAST PARTIALLY ON SENSOR INFORMATION AND RF SIGNAL INFORMATION
1120

PERFORM, BY THE PROCESSOR, ENVIRONMENT CLASSIFICATION OF THE WIRELESS NETWORK ENVIRONMENT ACCORDING TO THE ONE OR MORE FEATURE METRICS
1130

UPDATE, BY THE PROCESSOR, THE MACHINE-LEARNING MODEL WITH A RESULT OF THE ENVIRONMENT CLASSIFICATION, AS CURRENT STATUS, VIA AN ON-DEVICE LEARNING MECHANISM
1140

DETERMINE, BY THE PROCESSOR, AN ACTION TO UNDERTAKE BASED ON THE RESULT OF THE ENVIRONMENT CLASSIFICATION AND UE INFORMATION
1150

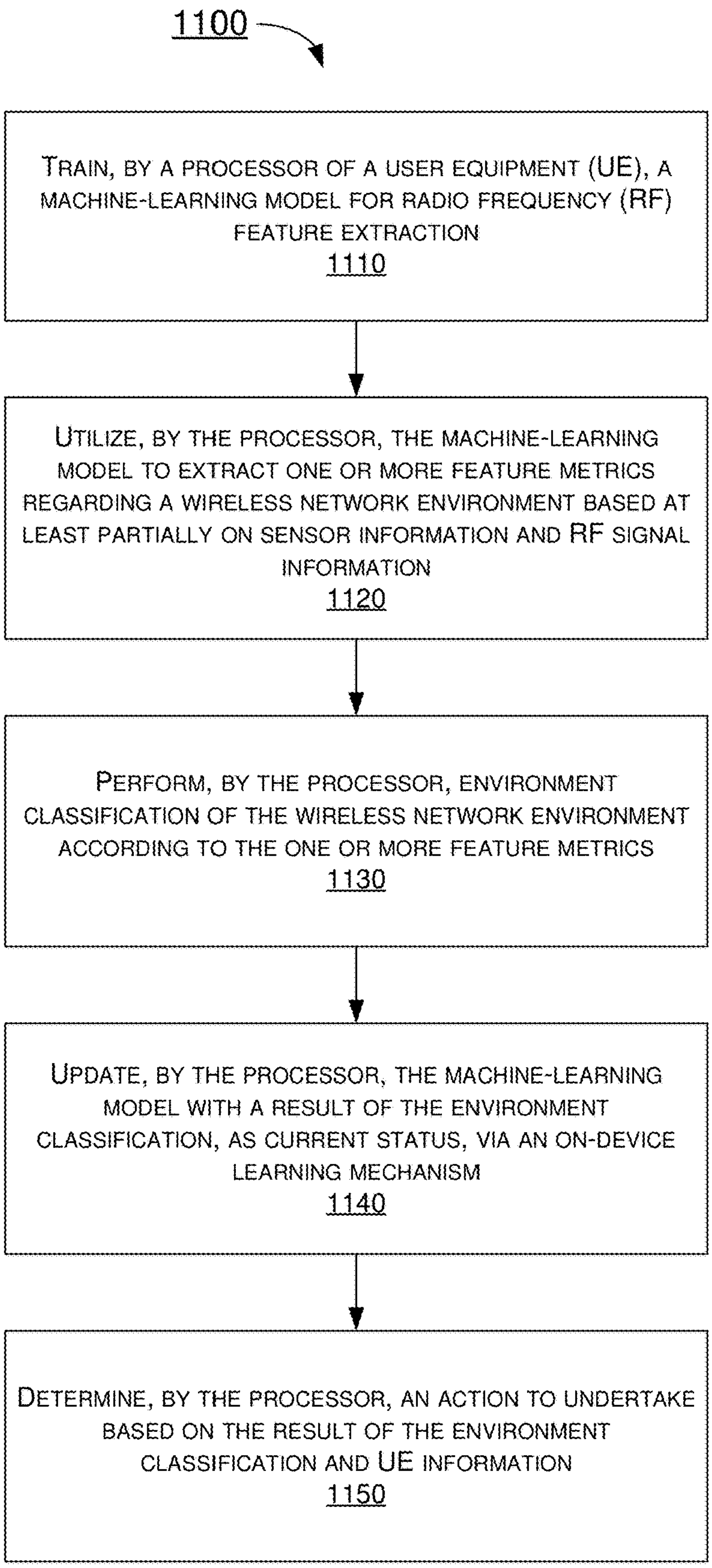

FIG. 11

MACHINE-LEARNING ASSISTED ENVIRONMENT DETECTION FRAMEWORK FOR SELF-ADAPTING INTER-RAT STEERING STRATEGY

CROSS REFERENCE TO RELATED PATENT APPLICATION

The present disclosure is part of a non-provisional patent application claiming the priority benefit of U.S. Provisional Patent Application No. 63/282,741, filed 24 Nov. 2021, the content of which herein being incorporated by reference in its entirety.

TECHNICAL FIELD

The present disclosure is generally related to wireless communications and, more particularly, to a machine-learning assisted environment detection framework for self-adapting inter-radio access technology (inter-RAT) steering strategy in wireless communications.

BACKGROUND

Unless otherwise indicated herein, approaches described in this section are not prior art to the claims listed below and are not admitted as prior art by inclusion in this section.

For users of a mobile or otherwise portable user equipment (UE) such as a smartphone or tablet, one common issue that impacts user experience is poor network connection in certain environments such as, for example, when the user is watching an online video while in an elevator and/or when the user is on a conference call while crossing a tunnel. In those environments, different inter-RAT steering decisions in UE side may need to be applied. However, without a full knowledge from the perspective of network deployment, it tends to be difficult for a UE to apply a simple rule-based strategy for different scenarios in different environments. As such, degradation in user experience would likely occur if inter-RAT steering decision cannot be selected based on different signal patterns in a heterogeneous environment. For example, the UE might frequently experience an out-of-service issue, and additional delay might occur in resuming to connection to a higher RAT (e.g., delay in a 4th Generation (4G) to 5th Generation (5G) transition or in a 3$^{rd}$ Generation (3G) to 4G transition). Accordingly, there remain certain technical challenges to be addressed. For example, one challenge pertains to how to quantify the user experience and recognize complex and large dimensional signal patterns. Moreover, another challenge pertains to how to design on-device and self-adapting multi-RAT cell steering strategies according to different multi-RAT environments and recurrent signal pattern(s). Therefore, there is a need for a solution of a machine-learning assisted environment detection framework for self-adapting inter-RAT steering strategy in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to a machine-learning assisted environment detection framework for self-adapting inter-RAT steering strategy in wireless communications. Under various proposed schemes in accordance with the present disclosure, a machine-learning assisted method may be implemented to identify recurrent user scenarios based on similarity in radio signals and machine learning models, while utilizing sensor information. Advantageously, this may enable a UE to distinguish recurrent scenarios in a multi-RAT environment and select a most suitable strategy. Thus, it is believed that various schemes proposed herein may address or otherwise alleviate aforementioned challenges and issues.

In one aspect, a method may involve a processor of a UE extracting one or more feature metrics regarding a wireless network environment based at least partially on sensor information received from one or more sensors of the UE and radio frequency (RF) signal information from a RF circuit of the UE. The method may also involve the processor identifying a scenario with respect to a current status of the wireless network environment according to the one or more feature metrics. The method may further involve the processor performing a RAT-related operation responsive to the identifying of the scenario.

In another aspect, a method may involve a processor of a UE training a machine-learning model for RF feature extraction and utilizing the machine-learning model to extract one or more feature metrics regarding a wireless network environment based at least partially on sensor information and RF signal information. The method may also involve the processor performing environment classification of the wireless network environment according to the one or more feature metrics. The method may additionally involve the processor updating the machine-learning model with a result of the environment classification, as current status, via an on-device learning mechanism. The method may further involve the processor determining an action to undertake based on the result of the environment classification and UE information.

In yet another aspect, an apparatus implementable in a UE may include one or more sensors, a RF circuit configured to communicate wirelessly, and a processor coupled to the one or more sensors and the RF circuit. The processor may extract one or more feature metrics regarding a wireless network environment based at least partially on sensor information received from the one or more sensors and RF signal information from the RF circuit. The processor may also identify a scenario with respect to a current status of the wireless network environment according to the one or more feature metrics. The processor may further perform, via the RF circuit, a RAT-related operation in response to the identifying of the scenario.

It is noteworthy that, although description provided herein may be in the context of certain radio access technologies, networks and network topologies such as, 5G New Radio (NR) mobile communications, the proposed concepts, schemes and any variation(s)/derivative(s) thereof may be implemented in, for and by other types of radio access technologies, networks and network topologies such as, for example and without limitation, Wi-Fi, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 6 is a diagram of an example scenario under a proposed scheme in accordance with the present disclosure.

FIG. 10 is a flowchart of an example process in accordance with an implementation of the present disclosure.

FIG. 11 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to a machine-learning assisted environment detection framework for self-adapting inter-RAT steering strategy in wireless communications. According to the present disclosure, a number of possible solutions may be implemented separately or jointly. That is, although these possible solutions may be described below separately, two or more of these possible solutions may be implemented in one combination or another.

Figure 1:
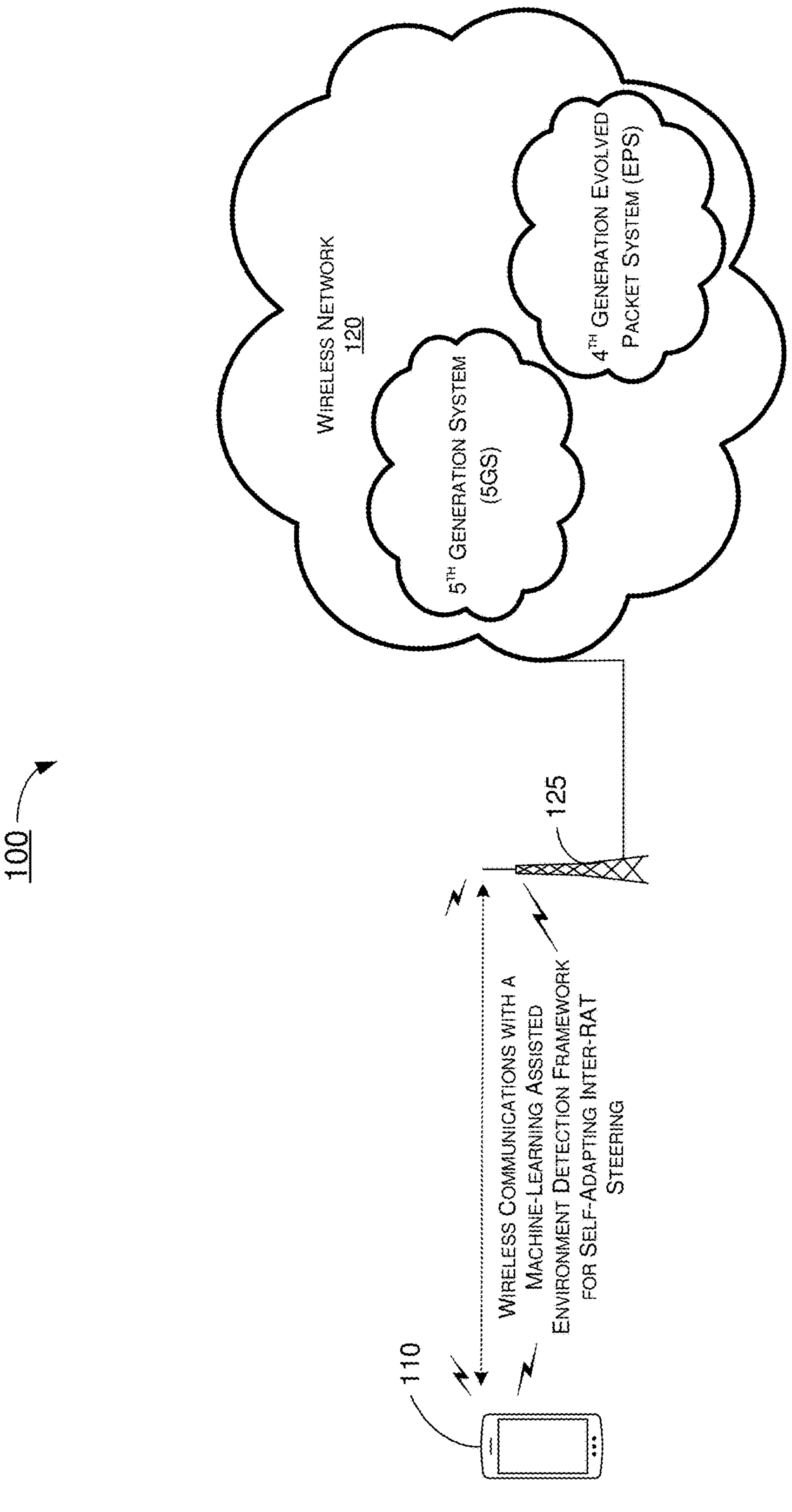
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 11 illustrate examples of implementation of various proposed schemes in network environment 100 in accordance with the present disclosure. The following description of various proposed schemes is provided with reference to FIG. 1~FIG. 11.

Referring to FIG. 1, network environment 100 may involve at least a UE 110 communicating wirelessly with a wireless network 120 via a network node 125 (e.g., an eNB or gNB). Each of UE 110 and wireless network 120 may be configured to communicate with each other by utilizing the various proposed schemes described herein pertaining to a machine-learning assisted environment detection framework for self-adapting inter-RAT steering strategy in wireless communications. It is noteworthy that, while the various proposed schemes may be individually or separately described below, in actual implementations each of the proposed schemes may be utilized individually or separately. Alternatively, some or all of the proposed schemes may be utilized jointly.

Figure 2:
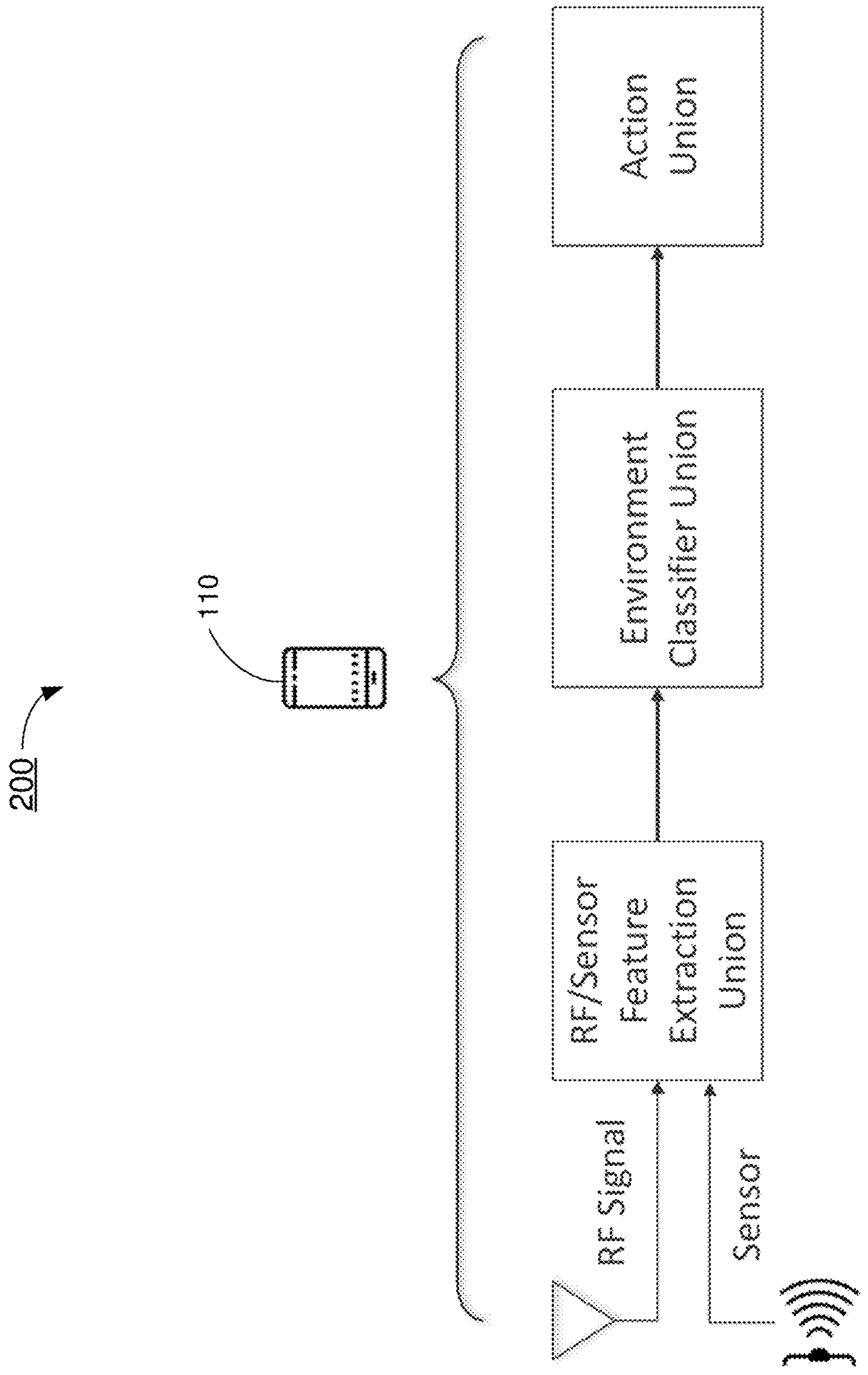
FIG. 2 is a diagram of an example framework under a proposed scheme in accordance with the present disclosure.

FIG. 2 illustrates an example framework 200 under a proposed scheme in accordance with the present disclosure. Under the proposed scheme in framework 200, an adaptive machine-learning assisted method may be implemented in or by UE 110 to identify recurrent user scenarios. For instance, the adaptive machine-learning assisted method may assist UE 110 in identifying recurrent user scenarios based on similarity in radio signals and machine learning models, while utilizing sensor information from one or more sensors of UE 110. Accordingly, UE 110 may distinguish recurrent scenarios in a multi-RAT environment and select a most suitable strategy among a plurality of available/possible strategies. Referring to FIG. 2, in framework 200, UE 110 may be configured to implement multiple functions or components such as, for example and without limitation, a Feature Extraction Union component, an Environment Classifier Union component, and an Action Union component. Moreover, an on-device learning mechanism may be applied between the Feature Extraction Union component and the Environment Classifier Union component, and this on-device learning mechanism may dynamically tune one or more decision-making models implemented on UE 110.

Figure 3:
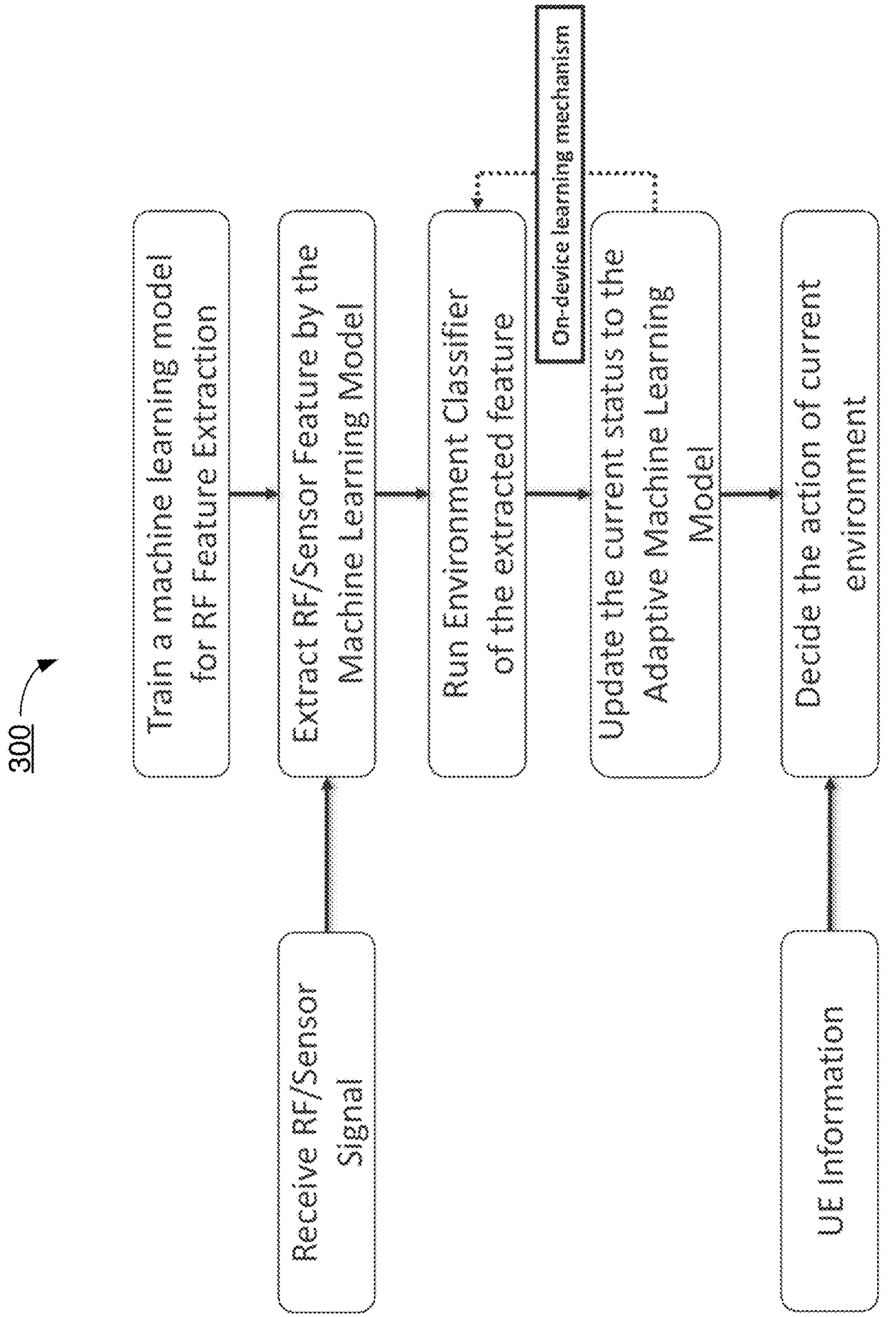
FIG. 3 is a diagram of an example scenario under a proposed scheme in accordance with the present disclosure.

FIG. 3 illustrates an example scenario 300 of framework 200 in operation. Referring to FIG. 3, in framework 200, an adaptive machine-learning model may be trained for RF feature extraction. With received RF signal information and sensor information as input, the adaptive machine-learning model may extract RF and sensor features (e.g., by the Feature Extraction Union component), based on which environment classification may be performed (e.g., by the Environment Classifier Union component). The result of the environment classification, as current status, may be updated to the adaptive machine-learning model (e.g., by the Environment Classifier Union component) via the on-device learning mechanism. Then, a course of action may be decided and taken (e.g., by the Action Union component) based on the current environment according to the result of the environment classification and based on UE information (e.g., information on which mode the UE is in, such as a connected mode or an idle mode).

Figure 4:
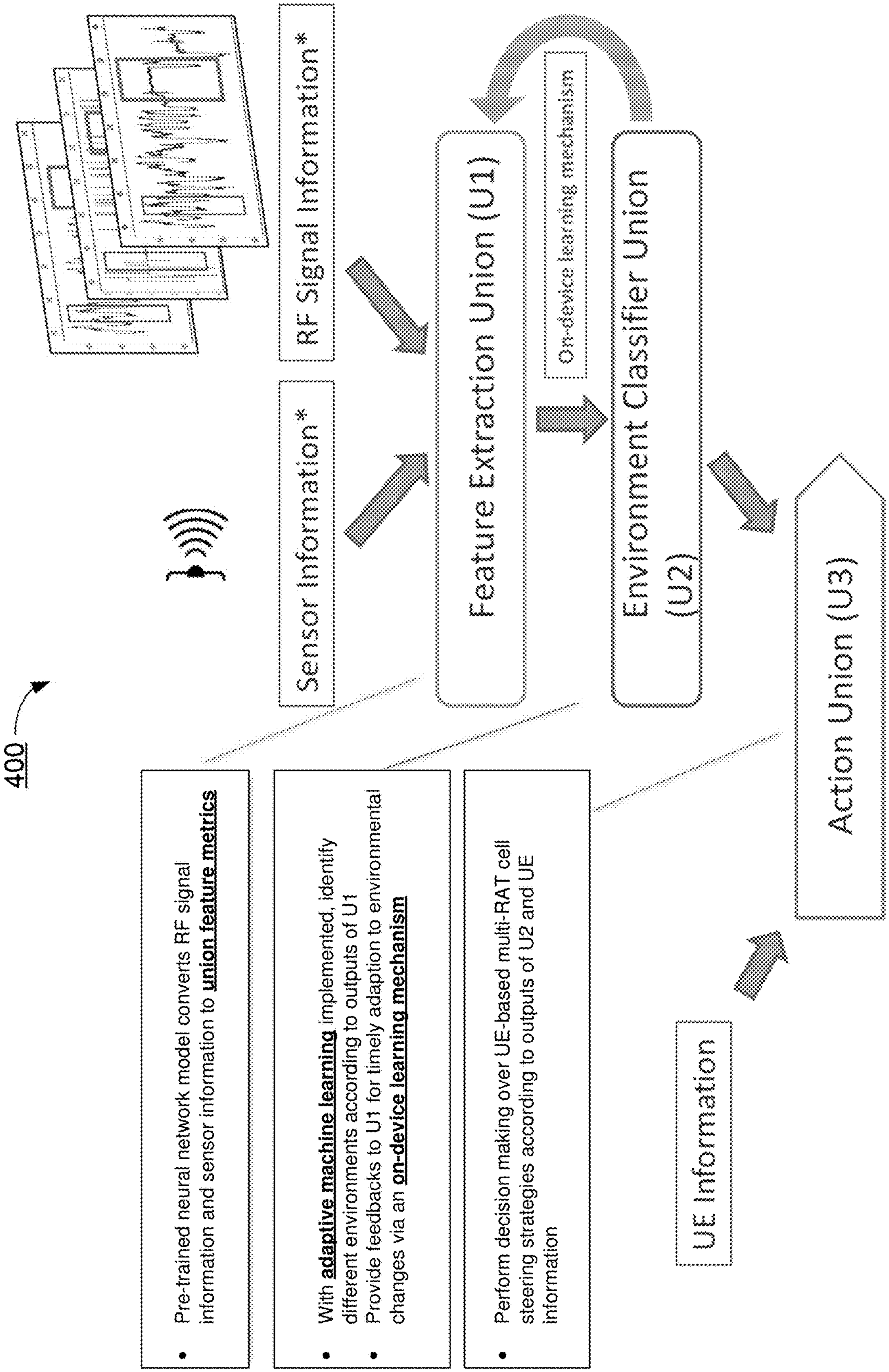
FIG. 4 is a diagram of an example scenario under a proposed scheme in accordance with the present disclosure.

FIG. 4 illustrates an example scenario 400 of framework 200 in implementation by UE 110. In scenario 400, the Feature Extraction Union component may receive sensor information (e.g., from one or more sensors of UE 110) and RF signal information (e.g., from a RF circuit or transceiver of UE 110) to convert the sensor information and RF information, based on a pre-trained neural network model, to union feature metrics as outputs that is provided to the Environment Classifier Union component. The Environment Classifier Union component may, with adaptive machine learning implemented, identify different environments according to outputs of the Feature Extraction Union component. The Environment Classifier Union component may also provide feedbacks to the Feature Extraction Union component via the on-device learning mechanism for timely adaption to environmental changes. The Action Union component may perform decision making over UE-based multi-RAT cell steering strategies according to outputs of the Environment Classifier Union component as well as UE information (e.g., from system information of UE 110, one or more other functions of UE 110 and/or user input).

Under the proposed scheme, the various components or functions of framework 200 may provide UE 110 with a machine-learning assisted environment detection framework to perform smart inter-RAT cell steering in a fluctuating multi-RAT environment. For illustrative purposes without limitation, in the fluctuating multi-RAT environment, the priority of a first RAT (RAT_1) may be higher than that of a second RAT (RAT_2), and UE 110 may be in an environment where both RAT_1 and RAT_2 may be available. Moreover, inter-RAT measurements may be not configured between RAT_1 cells and RAT_2 cells. Furthermore, RAT priorities may depend on UE application and signal environment. Under the proposed scheme, at a first stage, UE 110 may camp on RAT_1 initially and then select to camp on RAT_2 sometime later. At a second stage, the framework of framework 200 may be triggered to monitor RF signals and or changes in the environment. At a third stage, in case that a specific scenario is detected, the framework may assist UE 110 in making an inter-RAT steering decision at a suitable timing.

Figure 5:
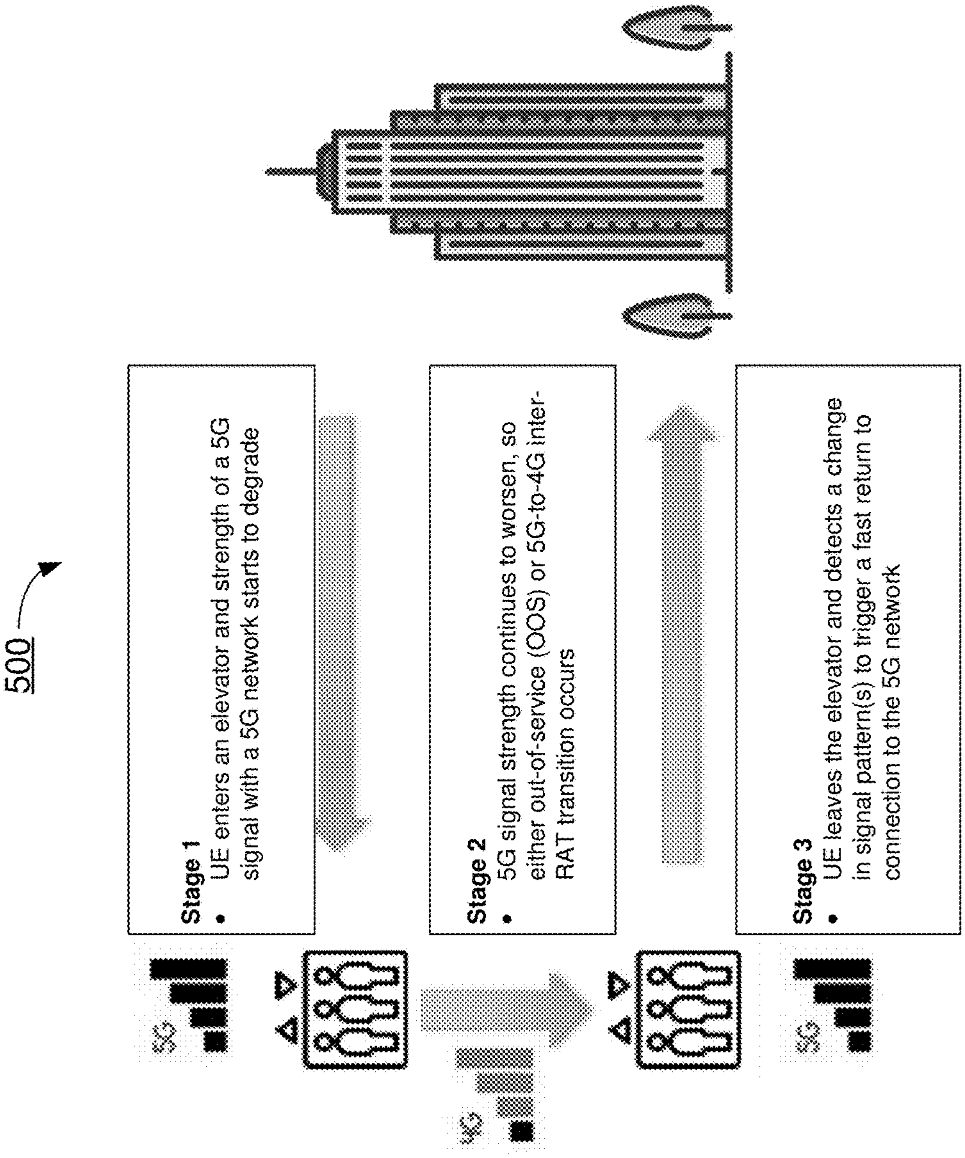
FIG. 5 is a diagram of an example scenario under a proposed scheme in accordance with the present disclosure.

FIG. 5 illustrates an example scenario 500 in which various proposed schemes in accordance with the present disclosure may be implemented. In particular, scenario 500 may be an example use case in which a user may be using UE 110 while entering and exiting an elevator. At a first stage, UE 110 may be connected to a 5G network while the user enters an elevator, thereby resulting in 5G signal strength to start to degrade. At a second stage, the 5G signal strength continues to worsen to a point where either out-of-service (OOS) occurs or a 5G-to-4G inter-RAT steering (herein interchangeably referred to as "inter-RAT transition") happens. At a third stage, when the user exists the elevator, UE 110 may detect a change in signal pattern(s) (e.g., increase in 5G signal strength) and, thus, may trigger a fast return to connection to the 5G network (e.g., as the 5G network may be associated with a priority level higher than that associated with the 4G network due to wider bandwidth and/or faster speed provided by the 5G network).

FIG. 6 illustrates an example scenario 600 in which various proposed schemes in accordance with the present disclosure may be implemented. In particular, scenario 600 may be an example use case in which a user may be on an Internet Protocol (IP) Multimedia Subsystem (IMS) call using UE 110 while entering and exiting a tunnel. At a first stage, UE 110 may be rendering a voice over New Radio (VoNR) call while the user (and UE 110) enters a tunnel. At a second stage, an OOS occurs due to 5G cell signal degradation in a connection with a 5G network. UE 110 may detect a change in signal pattern(s) and determine whether it is a short-period OOS or a long-period OOS. At a third stage, in an event that UE 110 determines that a short-period OOS is being experienced, UE 110 may hold on the VoNR session and reconnect to the 5G network after the 5G cell signal resumes (e.g., as the 5G network may be associated with a priority level higher than that associated with a 4G/LTE network due to wider bandwidth and/or faster speed provided by the 5G network). Alternatively, at the third stage, in an event that UE 110 determines that a long-period OOS is being experienced, UE 110 may trigger an Evolved Packet System (EPS) fallback (if the 4G/LTE network is available) so as to reestablish a call session on the 4G/LTE network.

Figure 7:
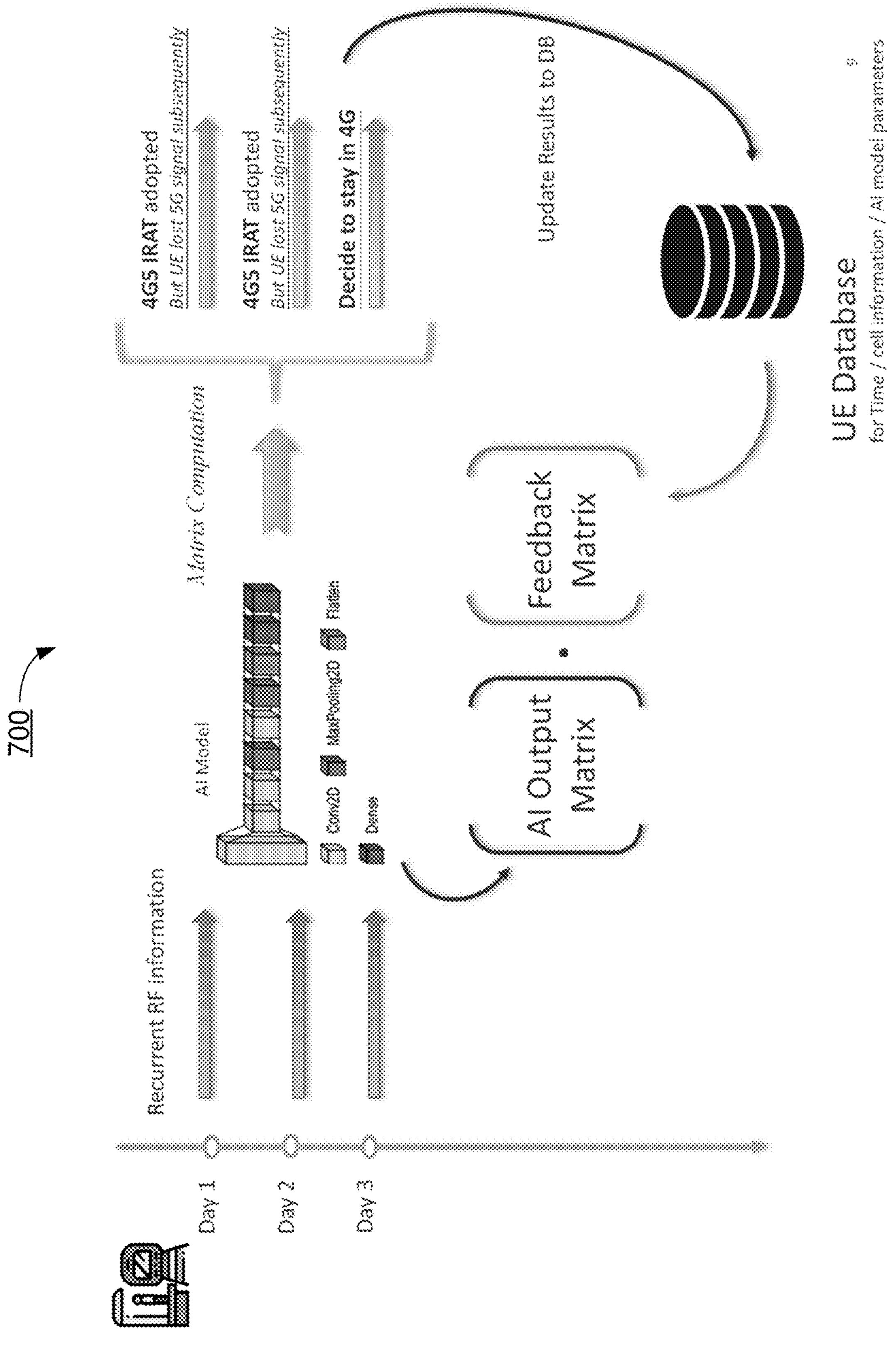
FIG. 7 is a diagram of an example scenario under a proposed scheme in accordance with the present disclosure.

FIG. 7 illustrates an example scenario 700 in which various proposed schemes in accordance with the present disclosure may be implemented. In particular, scenario 700 may be an example use case of on-device learning with respect to a personalized UE RAT selecting strategy. In scenario 700, in multiple consecutive days (e.g., Day 1, Day 2 and Day 3), UE 110 may detect or otherwise receive recurrent RF information (e.g., recurrent RF signal patterns with similarity between one day and another day). This information may be provided to an artificial intelligent (AI) model, such as that of framework 200, to generate an AI output matrix and perform a matrix computation. For illustrative purposes without limitation, in the outputs of the matrix computation, for Day 1 there may be a pattern of an inter-RAT steering or transition from a 4G network to a 5G network although UE 110 subsequently lost a 5G signal. For Day 2, there may be another pattern of an inter-RAT steering or transition from the 4G network to the 5G network although UE 110 subsequently lost the 5G signal. For Day 3, there may be a pattern of UE 110 deciding to stay connected to the 4G network. Such outputs or results may be provided and stored in a UE database (e.g., in a memory device of UE 110), which may store time/cell information as well as AI model parameters. Information stored in the UE database may be provided in a feedback matrix which, together with the AI output matrix, may be utilized by UE 110 in on-device learning to personalize RAT selection strategy for UE 110.

Figure 8:
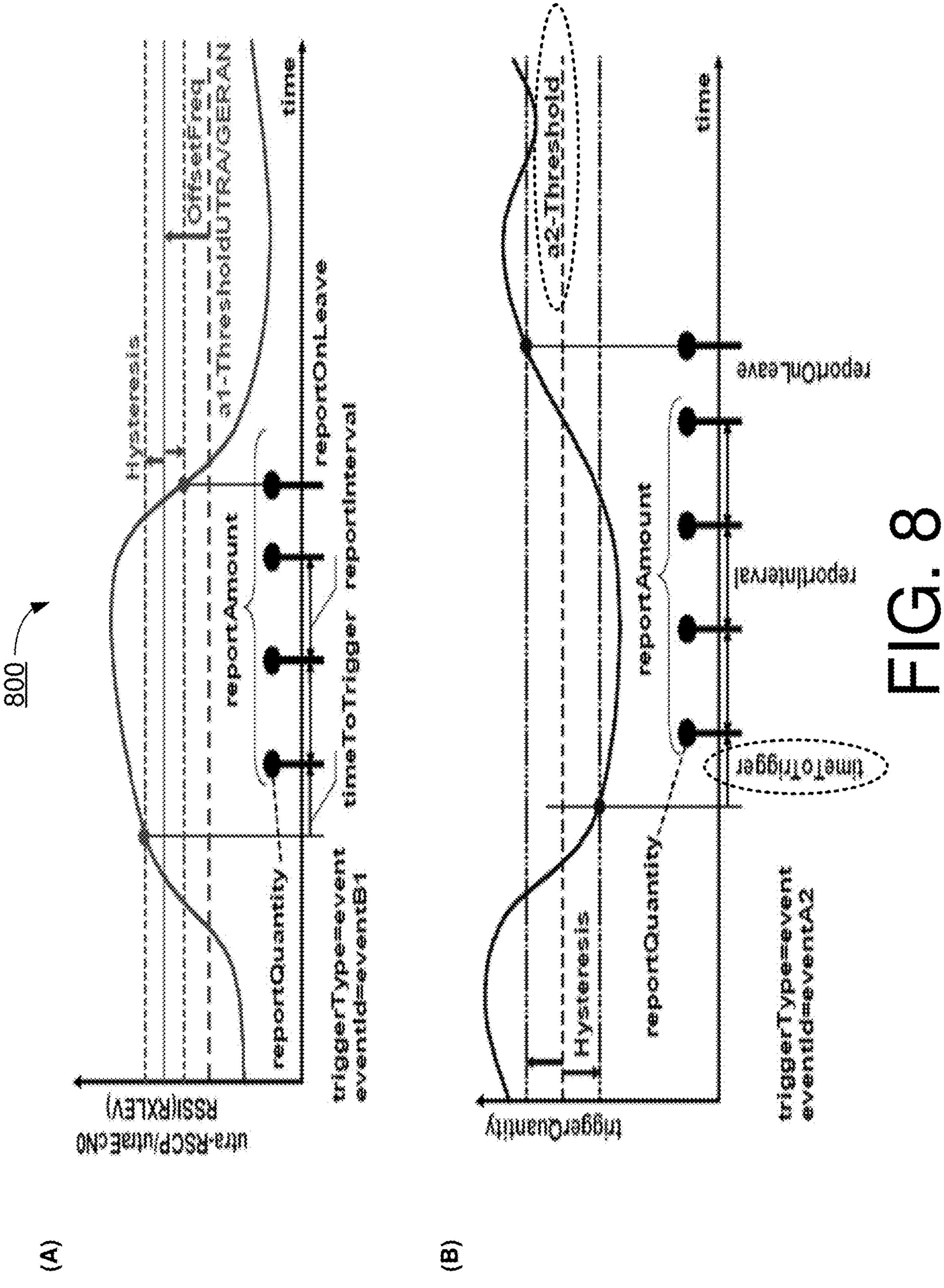
FIG. 8 is a diagram of an example scenario under a proposed scheme in accordance with the present disclosure.

FIG. 8 illustrates an example scenario 800 of possible RAT selection strategies under a proposed scheme in accordance with the present disclosure. Referring to part (A) of FIG. 8, under the proposed scheme, UE 110 may adjust parameter(s) of an event (e.g., B1 event) in a measurement report. For example, an offset may be added (e.g., increased ReportQuantity) to trigger UE 110 to report B1 event value. Referring to part (B) of FIG. 8, under the proposed scheme, an increased threshold of entering a given condition (e.g., A2 condition) may trigger UE 110 to report the A2 event, while ignoring the parameter timeToTrigger may trigger UE 110 to report immediately.

In view of the above, under various proposed schemes in accordance with the present disclosure, a machine-learning based method may be utilized in or by UE 110 to identify recurrent user scenario(s) (e.g., 00S and/or inter-RAT steering or transition) by utilizing information such as RF signal information and sensor information. Additionally, an on-device learning mechanism may be utilized in or by UE 110 to compare feature similarity metrics to map UE recurrent scenarios and to update a UE database accordingly. Moreover, RAT selection strategies may be performed according to the UE database, thereby enabling UE 110 to make inter-RAT steering decision according to different UE scenarios. The RAT selection strategies may include adjustment in a trigger condition of a measurement report (e.g., A2/B1/

B2) to trigger network-leading inter-RAT steering or transition in a connected mode. The RAT selection strategies may also include UE 110 initiating a UE-based inter-RAT selection via a frequency scan which may include a local radio resource control (RRC) connection release in an idle mode.

The one or more sensors of UE 110 that provide the sensor information may include, for example and without limitation, ambient light sensor(s), proximity sensor(s), G-sensor(s), accelerometer sensor(s), magnetism sensor(s), gyroscope(s), and/or global positioning system (GPS) sensor(s). The RF signal information received or otherwise detected by a RF circuit of UE 110 may include, for example and without limitation, reference signal received power (RSRP), reference signal received quality (RSRQ), signal-to-interference noise ratio (SINR), and/or received signal strength indicator (RSSI) of a serving cell and/or a neighbor cell, frequency/band/physical cell identifier (PCI) information, block error rate (BLER), number and frequency of in-synchronization/out-of-synchronization occurrences, number and frequency of handover/redirection events, types and frequency of measurement reports, and/or data transmission latency.

Illustrative Implementations

Figure 9:
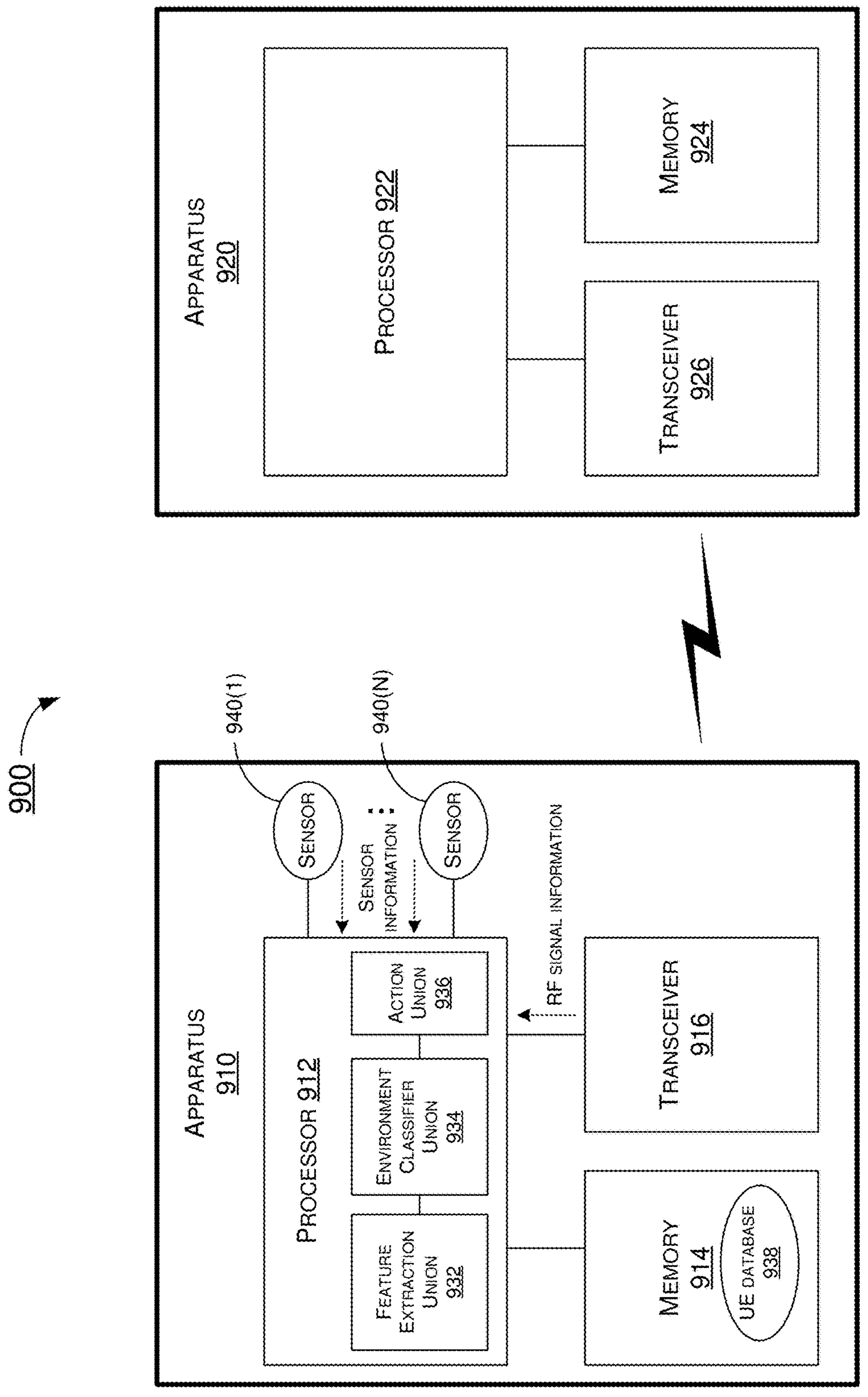
FIG. 9 is a block diagram of an example communication system in accordance with an implementation of the present disclosure.

FIG. 9 illustrates an example system 900 having at least an example apparatus 910 and an example apparatus 920 in accordance with an implementation of the present disclosure. Each of apparatus 910 and apparatus 920 may perform various functions to implement schemes, techniques, processes and methods described herein pertaining to a machine-learning assisted environment detection framework for self-adapting inter-RAT steering strategy in wireless communications, including the various schemes described above with respect to various proposed designs, concepts, schemes, systems and methods described above as well as processes described below. For instance, apparatus 910 may be implemented in UE 110 and apparatus 920 may be implemented in network node 125, or vice versa.

Each of apparatus 910 and apparatus 920 may be a part of an electronic apparatus, such as a portable or mobile apparatus, a wearable apparatus, a wireless communication apparatus or a computing apparatus. For instance, each of apparatus 910 and apparatus 920 may be implemented in a smartphone, a smart watch, a personal digital assistant, a digital camera, or a computing equipment such as a tablet computer, a laptop computer or a notebook computer. Each of apparatus 910 and apparatus 920 may also be a part of a machine type apparatus, which may be an IoT apparatus such as an immobile or a stationary apparatus, a home apparatus, a wire communication apparatus or a computing apparatus. For instance, each of apparatus 910 and apparatus 920 may be implemented in a smart thermostat, a smart fridge, a smart door lock, a wireless speaker or a home control center. When implemented in or as a network apparatus, apparatus 910 and/or apparatus 920 may be implemented in a network node, such as an eNB, gNB or transmit-and-receive point (TRP).

In some implementations, each of apparatus 910 and apparatus 920 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Each of apparatus 910 and apparatus 920 may include at least some of those components shown in FIG. 9 such as a processor 912 and a processor 922, respectively, for example. Each of apparatus 910 and apparatus 920 may further include one or more other components not pertinent to the proposed scheme of the present disclosure (e.g., internal power supply, display device and/or user interface device), and, thus, such component(s) of apparatus 910 and apparatus 920 are neither shown in FIG. 9 nor described below in the interest of simplicity and brevity.

In one aspect, each of processor 912 and processor 922 may be implemented in the form of one or more single-core processors, one or more multi-core processors, one or more RISC processors or one or more CISC processors. That is, even though a singular term "a processor" is used herein to refer to processor 912 and processor 922, each of processor 912 and processor 922 may include multiple processors in some implementations and a single processor in other implementations in accordance with the present disclosure. In another aspect, each of processor 912 and processor 922 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 912 and processor 922 is a special-purpose machine specifically designed, arranged and configured to perform specific tasks including those pertaining to a machine-learning assisted environment detection framework for self-adapting inter-RAT steering strategy in wireless communications in accordance with various implementations of the present disclosure. For instance, when apparatus 910 is implemented in or as UE 110, processor 912 may include certain hardware components (e.g., circuits) configured to perform various functions of framework 200. As shown in FIG. 9, processor 912 may include a feature extraction union circuit 932, an environment classifier union circuit 934 and an action union circuit 936 that are configured to perform the functionality of the Feature Extraction Union component, Environment Classifier Union component and Action Union component of framework 200, respectively. Alternatively, or additionally, software, firmware and/or middleware may be executed by processor 912 to perform some or all of the functions of framework 200.

In some implementations, apparatus 910 may also include a transceiver 916 coupled to processor 912. Transceiver 916, as a RF circuit, may include a transmitter capable of wirelessly transmitting and a receiver capable of wirelessly receiving data. In operation, transceiver 916 may provide RF signal information to processor 912 to perform machine-learning assisted environment framework for self-adapting inter-RAT steering under various proposed schemes in accordance with the present disclosure. In some implementations, apparatus 920 may also include a transceiver 926 coupled to processor 922. Transceiver 926 may include a transmitter capable of wirelessly transmitting and a receiver capable of wirelessly receiving data. It is noteworthy that, although transceiver 916 and transceiver 926 are illustrated as being external to and separate from processor 912 and processor 922, respectively, in some implementations, transceiver 916 may be an integral part of processor 912 as a system on chip (SoC) and/or transceiver 926 may be an integral part of processor 922 as a SoC.

In some implementations, apparatus 910 may further include a memory 914 coupled to processor 912 and capable of being accessed by processor 912 and storing data therein. For instance, when apparatus 910 is implemented in or as UE 110, memory 914 may include a UE database 938 utilized by framework 200 in various scenarios, including the example scenarios described herein. In some implementations, apparatus 920 may further include a memory 924 coupled to processor 922 and capable of being accessed by processor 922 and storing data therein. Each of memory 914 and memory 924 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 914 and memory 924 may include a type of read-only memory (ROM) such as mask ROM, programmable ROM (PROM), erasable programmable ROM (EPROM) and/or electrically erasable programmable ROM (EEPROM). Alternatively, or additionally, each of memory 914 and memory 924 may include a type of non-volatile random-access memory (NVRAM) such as flash memory, solid-state memory, ferroelectric RAM (FeRAM), magnetoresistive RAM (MRAM) and/or phase-change memory.

In some implementations, apparatus 910 may also include one or more sensors 940(1)~940(N), with N being a positive integer (N 1). The one or more sensors 940(1)~940(N) may include, for example and without limitation, ambient light sensor(s), proximity sensor(s), G-sensor(s), accelerometer sensor(s), magnetism sensor(s), gyroscope(s), and/or GPS sensor(s). In operation, the one or more sensors 940(1)~940(N) may provide sensor information to processor 912 to perform machine-learning assisted environment framework for self-adapting inter-RAT steering under various proposed schemes in accordance with the present disclosure.

Each of apparatus 910 and apparatus 920 may be a communication entity capable of communicating with each other using various proposed schemes in accordance with the present disclosure. For illustrative purposes and without limitation, a description of capabilities of apparatus 910, as UE 110, and apparatus 920, as network node 125, is provided below. It is noteworthy that, although a detailed description of capabilities, functionalities and/or technical features of apparatus 920 is provided below, the same may be applied to apparatus 910 although a detailed description thereof is not provided solely in the interest of brevity. It is also noteworthy that, although the example implementations described below are provided in the context of WLAN, the same may be implemented in other types of networks.

In one aspect pertaining to a machine-learning assisted environment detection framework for self-adapting inter-RAT steering strategy in wireless communications in accordance with the present disclosure, with apparatus 910 implemented in or as UE 110 and apparatus 920 implemented in or as network node 125 in network environment 100, processor 912 of apparatus 910 may extract one or more feature metrics regarding a wireless network environment based at least partially on sensor information received from one or more sensors 940(1)~940(N) and RF signal information from transceiver 916 as a RF circuit. Additionally, processor 912 may identify a scenario with respect to a current status of the wireless network environment according to the one or more feature metrics. Moreover, processor 912 may perform, via transceiver 916, a RAT-related operation responsive to the identifying of the scenario.

In some implementations, in extracting the one or more feature metrics, processor 912 may perform certain operations. For instance, processor 912 may train a machine-learning model with previous sensor information and previous RF signal information. Moreover, processor 912 may extract the one or more feature metrics by utilizing the machine-learning model based on the received sensor information and RF signal information.

In some implementations, in identifying the scenario, processor 912 may perform certain operations. For instance, processor 912 may perform environment classification on the extracted one or more feature metrics. Moreover, processor 912 may determine that the scenario is a recurrent scenario according to a result of the environment classification. Furthermore, processor 912 may update the machine-learning model with a result of the environment classification, as current status, via an on-device learning mechanism.

In some implementations, the on-device learning mechanism may involve processor 912 performing certain operations. For instance, processor 912 may compare feature similarity metrics to map the scenario to one or more recurrent scenarios. Additionally, processor 912 may update a database (e.g., UE database 938) with a result of the comparing. The database may be utilized by the machine-learning model in extracting the one or more feature metrics.

In some implementations, in performing the RAT-related operation, processor 912 may perform inter-RAT steering based on one or more RAT selection strategies according to the database. In some implementations, the one or more RAT selection strategies may include an adjustment in a trigger condition of a measurement report to trigger network-leading inter-RAT steering when UE 110 is in a connected mode. Alternatively, or additionally, the one or more RAT selection strategies may include initiating a UE-based inter-RAT selection via a frequency scan involving a local RRC connection release when UE 110 is in an idle mode.

In some implementations, in performing the RAT-related operation, processor 912 may perform certain operations. For instance, processor 912 may transition from a first RAT to camp on a second RAT responsive to degradation of a signal strength of the first RAT to less than a threshold. Moreover, processor 912 may transition back to camp on the first RAT from the second RAT responsive to the signal strength of the first RAT resuming to equal to or greater than the threshold. Here, a first priority level associated with the first RAT may be higher than a second priority level associated with the second RAT.

In some implementations, the sensor information may include information received from one or more of the following: an ambient light sensor, a proximity sensor, a G-sensor, an accelerometer sensor, a magnetism sensor, a gyroscope, and a GPS sensor.

In some implementations, the RF signal information may include one or more of the following pieces of information: RSRP/RSRQ/SINR/RSSI of a serving cell and/or a neighbor cell, frequency information, band information, PCI information, a BLER, a number and a frequency of in-synchronization and/or out-of-synchronization occurrences, a number and a frequency of handover and/or redirection events, types and a frequency of measurement reports, and a data transmission latency.

In another aspect pertaining to a machine-learning assisted environment detection framework for self-adapting inter-RAT steering strategy in wireless communications in accordance with the present disclosure, with apparatus 910 implemented in or as UE 110 and apparatus 920 implemented in or as network node 125 in network environment 100, processor 912 of apparatus 910 may train a machine-learning model for RF feature extraction. Additionally, processor 912 may utilize the machine-learning model to extract one or more feature metrics regarding a wireless network environment based at least partially on sensor information and RF signal information. Also, processor 912 may perform environment classification of the wireless network environment according to the one or more feature metrics. Moreover, processor 912 may update the machine-learning model with a result of the environment classification, as current status, via an on-device learning mechanism. Furthermore, processor 912 may determine an action to undertake based on the result of the environment classification and UE information.

In some implementations, the on-device learning mechanism may involve processor 912 performing certain operations. For instance, processor 912 may compare feature similarity metrics to map the current status to one or more recurrent scenarios. Additionally, processor 912 may update a database with a result of the comparing. The database may be utilized by the machine-learning model in extracting the one or more feature metrics.

In some implementations, processor 912 may perform inter-RAT steering based on one or more RAT selection strategies according to the database.

In some implementations, the one or more RAT selection strategies may include an adjustment in a trigger condition of a measurement report to trigger network-leading inter-RAT steering when UE 110 is in a connected mode. Alternatively, or additionally, the one or more RAT selection strategies may include initiating a UE-based inter-RAT selection via a frequency scan involving a local RRC connection release when UE 110 is in an idle mode.

In some implementations, in performing the inter-RAT steering, processor 912 may perform additional operations. For instance, processor 912 may transition from a first RAT to camp on a second RAT responsive to degradation of a signal strength of the first RAT to less than a threshold. Moreover, processor 912 may transition back to camp on the first RAT from the second RAT responsive to the signal strength of the first RAT resuming to equal to or greater than the threshold. In such cases, a first priority level associated with the first RAT may be higher than a second priority level associated with the second RAT.

In some implementations, the sensor information may include information received from one or more of the following: an ambient light sensor, a proximity sensor, a G-sensor, an accelerometer sensor, a magnetism sensor, a gyroscope, and a GPS sensor.

In some implementations, the RF signal information may include one or more of the following pieces of information: RSRP/RSRQ/SINR/RSSI of a serving cell and/or a neighbor cell, frequency information, band information, PCI information, a BLER, a number and a frequency of in-synchronization and/or out-of-synchronization occurrences, a number and a frequency of handover and/or redirection events, types and a frequency of measurement reports, and a data transmission latency.

Illustrative Processes

FIG. 10 illustrates an example process 1000 in accordance with an implementation of the present disclosure. Process 1000 may represent an aspect of implementing various proposed designs, concepts, schemes, systems and methods described above. More specifically, process 1000 may represent an aspect of the proposed concepts and schemes pertaining to a machine-learning assisted environment detection framework for self-adapting inter-RAT steering strategy in wireless communications in accordance with the present disclosure. Process 1000 may include one or more operations, actions, or functions as illustrated by one or more of blocks 1010, 1020 and 1030. Although illustrated as discrete blocks, various blocks of process 1000 may be divided into additional blocks, combined into fewer blocks, or eliminated, depending on the desired implementation. Moreover, the blocks/sub-blocks of process 1000 may be executed in the order shown in FIG. 10 or, alternatively in a different order. Furthermore, one or more of the blocks/sub-blocks of process 1000 may be executed repeatedly or iteratively. Process 1000 may be implemented by or in apparatus 910 and apparatus 920 as well as any variations thereof. Solely for illustrative purposes and without limiting the scope, process 1000 is described below in the context of apparatus 910 implemented in or as UE 110 and apparatus 920 implemented in or as network node 125 of wireless network 125 in environment 100. Process 1000 may begin at block 1010.

At 1010, process 1000 may involve processor 912 of apparatus 910, as UE 110, extracting one or more feature metrics regarding a wireless network environment based at least partially on sensor information received from one or more sensors 940(1)~940(N) and RF signal information from transceiver 916 as a RF circuit. Process 1000 may proceed from 1010 to 1020.

At 1020, process 1000 may involve processor 912 identifying a scenario with respect to a current status of the wireless network environment according to the one or more feature metrics. Process 1000 may proceed from 1020 to 1030.

At 1030, process 1000 may involve processor 912 performing, via transceiver 916, a RAT-related operation responsive to the identifying of the scenario.

In some implementations, in extracting the one or more feature metrics, process 1000 may involve processor 912 performing certain operations. For instance, process 1000 may involve processor 912 training a machine-learning model with previous sensor information and previous RF signal information. Moreover, process 1000 may involve processor 912 extracting the one or more feature metrics by utilizing the machine-learning model based on the received sensor information and RF signal information.

In some implementations, in identifying the scenario, process 1000 may involve processor 912 performing certain operations. For instance, process 1000 may involve processor 912 performing environment classification on the extracted one or more feature metrics. Moreover, process 1000 may involve processor 912 determining that the scenario is a recurrent scenario according to a result of the environment classification. Furthermore, process 1000 may involve processor 912 updating the machine-learning model with a result of the environment classification, as current status, via an on-device learning mechanism.

In some implementations, the on-device learning mechanism may involve processor 912 performing certain operations. For instance, processor 912 may compare feature similarity metrics to map the scenario to one or more recurrent scenarios. Additionally, processor 912 may update a database (e.g., UE database 938) with a result of the comparing. The database may be utilized by the machine-learning model in extracting the one or more feature metrics.

In some implementations, in performing the RAT-related operation, process 1000 may involve processor 912 performing inter-RAT steering based on one or more RAT selection strategies according to the database. In some implementations, the one or more RAT selection strategies may include an adjustment in a trigger condition of a measurement report to trigger network-leading inter-RAT steering when UE 110 is in a connected mode. Alternatively, or additionally, the one or more RAT selection strategies may include initiating a UE-based inter-RAT selection via a frequency scan involving a local RRC connection release when UE 110 is in an idle mode.

In some implementations, in performing the RAT-related operation, process 1000 may involve processor 912 performing certain operations. For instance, process 1000 may involve processor 912 transitioning from a first RAT to camp on a second RAT responsive to degradation of a signal strength of the first RAT to less than a threshold. Moreover, process 1000 may involve processor 912 transitioning back to camp on the first RAT from the second RAT responsive to the signal strength of the first RAT resuming to equal to or greater than the threshold. Here, a first priority level associated with the first RAT may be higher than a second priority level associated with the second RAT.

In some implementations, the sensor information may include information received from one or more of the following: an ambient light sensor, a proximity sensor, a G-sensor, an accelerometer sensor, a magnetism sensor, a gyroscope, and a GPS sensor.

In some implementations, the RF signal information may include one or more of the following pieces of information: RSRP/RSRQ/SINR/RSSI of a serving cell and/or a neighbor cell, frequency information, band information, PCI information, a BLER, a number and a frequency of in-synchronization and/or out-of-synchronization occurrences, a number and a frequency of handover and/or redirection events, types and a frequency of measurement reports, and a data transmission latency.

FIG. 11 illustrates an example process 1100 in accordance with an implementation of the present disclosure. Process 1100 may represent an aspect of implementing various proposed designs, concepts, schemes, systems and methods described above. More specifically, process 1100 may represent an aspect of the proposed concepts and schemes pertaining to a machine-learning assisted environment detection framework for self-adapting inter-RAT steering strategy in wireless communications in accordance with the present disclosure. Process 1100 may include one or more operations, actions, or functions as illustrated by one or more of blocks 1110, 1120, 1130, 1140 and 1150. Although illustrated as discrete blocks, various blocks of process 1100 may be divided into additional blocks, combined into fewer blocks, or eliminated, depending on the desired implementation. Moreover, the blocks/sub-blocks of process 1100 may be executed in the order shown in FIG. 11 or, alternatively in a different order. Furthermore, one or more of the blocks/sub-blocks of process 1100 may be executed repeatedly or iteratively. Process 1100 may be implemented by or in apparatus 910 and apparatus 920 as well as any variations thereof. Solely for illustrative purposes and without limiting the scope, process 1100 is described below in the context of apparatus 910 implemented in or as UE 110 and apparatus 920 implemented in or as network node 125 of wireless network 125 in environment 100. Process 1100 may begin at block 1110.

At 1110, process 1100 may involve processor 912 of apparatus 910, as UE 110, training a machine-learning model for RF feature extraction. Process 1100 may proceed from 1110 to 1120.

At 1120, process 1100 may involve processor 912 utilizing the machine-learning model to extract one or more feature metrics regarding a wireless network environment based at least partially on sensor information and RF signal information. Process 1100 may proceed from 1120 to 1130.

At 1130, process 1100 may involve processor 912 performing environment classification of the wireless network environment according to the one or more feature metrics. Process 1100 may proceed from 1130 to 1140.

At 1140, process 1100 may involve processor 912 updating the machine-learning model with a result of the environment classification, as current status, via an on-device learning mechanism. Process 1100 may proceed from 1140 to 1150.

At 1150, process 1100 may involve processor 912 determining an action to undertake based on the result of the environment classification and UE information.

In some implementations, the on-device learning mechanism may involve processor 912 performing certain operations. For instance, processor 912 may compare feature similarity metrics to map the current status to one or more recurrent scenarios. Additionally, processor 912 may update a database with a result of the comparing. The database may be utilized by the machine-learning model in extracting the one or more feature metrics.

In some implementations, process 1100 may further involve processor 912 performing inter-RAT steering based on one or more RAT selection strategies according to the database.

In some implementations, the one or more RAT selection strategies may include an adjustment in a trigger condition of a measurement report to trigger network-leading inter-RAT steering when UE 110 is in a connected mode. Alternatively, or additionally, the one or more RAT selection strategies may include initiating a UE-based inter-RAT selection via a frequency scan involving a local RRC connection release when UE 110 is in an idle mode.

In some implementations, in performing the inter-RAT steering, process 1100 may further involve processor 912 performing certain operations. For instance, process 1100 may further involve processor 912 transitioning from a first RAT to camp on a second RAT responsive to degradation of a signal strength of the first RAT to less than a threshold. Moreover, process 1100 may further involve processor 912 transitioning back to camp on the first RAT from the second RAT responsive to the signal strength of the first RAT resuming to equal to or greater than the threshold. In such cases, a first priority level associated with the first RAT may be higher than a second priority level associated with the second RAT.

In some implementations, the sensor information may include information received from one or more of the following: an ambient light sensor, a proximity sensor, a G-sensor, an accelerometer sensor, a magnetism sensor, a gyroscope, and a GPS sensor.

In some implementations, the RF signal information may include one or more of the following pieces of information: RSRP/RSRQ/SINR/RSSI of a serving cell and/or a neighbor cell, frequency information, band information, PCI information, a BLER, a number and a frequency of in-synchronization and/or out-of-synchronization occurrences, a number and a frequency of handover and/or redirection events, types and a frequency of measurement reports, and a data transmission latency.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. An apparatus implementable in a user equipment (UE), comprising:
- one or more sensors; a radio frequency (RF) circuit configured to communicate wirelessly; and
- a processor coupled to the one or more sensors and the RF circuit, the processor configured to perform operations comprising:
  - extracting one or more feature metrics regarding a wireless network environment based at least partially on sensor information received from the one or more sensors and RF signal information from the RF circuit;
  - identifying a scenario with respect to a current status of the wireless network environment according to the one or more feature metrics, wherein the scenario comprises a long-period out-of-service (OOS) or a short-period OOS; and
  - performing, via the RF circuit, a radio access technology (RAT)-related operation responsive to the identifying of the scenario;
- wherein the RAT-related operation comprises holding on a call session in an event that the scenario is the short-period OOS,
- in extracting the one or more feature metrics, the processor is configured to perform operations comprising:
  - training a machine-learning model with previous sensor information and previous RF signal information; and
  - extracting the one or more feature metrics by utilizing the machine-learning model based on the received sensor information and RF signal information;
- in identifying the scenario, the processor is configured to perform operations comprising:
  - performing environment classification on the extracted one or more feature metrics;
  - determining that the scenario is a recurrent scenario according to a result of the environment classification; and
  - updating the machine learning model with a result of the environment classification, as current status, via an on-device learning mechanism which involves:
    - comparing feature similarity metrics to map the scenario to one or more recurrent scenarios; and
    - updating a database with a result of the comparing,
- wherein the database is utilized by the machine-learning model in extracting the one or more feature metrics;

in performing the RAT-related operation, the processor is configured to perform inter-RAT steering based on one or more RAT selection strategies according to the database.

2. The apparatus of claim 1, wherein the one or more RAT selection strategies comprise an adjustment in a trigger condition of a measurement report to trigger network-leading inter-RAT steering when the UE is in a connected mode.

3. The apparatus of claim 1, wherein the one or more RAT selection strategies comprise initiating a UE-based inter-RAT selection via a frequency scan involving a local radio resource control (RRC) connection release when the UE is in an idle mode.

4. The apparatus of claim 1, wherein the performing of the inter-RAT steering comprises:

transitioning from a first RAT to camp on a second RAT responsive to degradation of a signal strength of the first RAT to less than a threshold; and transitioning back to camp on the first RAT from the second RAT responsive to the signal strength of the first RAT resuming to equal to or greater than the threshold, wherein a first priority level associated with the first RAT is higher than a second priority level associated with the second RAT.

5. The apparatus of claim 1, wherein the sensor information comprises information received from one or more of an ambient light sensor, a proximity sensor, a G-sensor, an accelerometer sensor, a magnetism sensor, a gyroscope, and a global positioning system (GPS) sensor.

* * * * *